United States Patent
Tajima

(10) Patent No.: US 9,152,369 B2
(45) Date of Patent: Oct. 6, 2015

(54) ELECTRONIC APPARATUS, CONTROL METHOD, AND STORAGE MEDIUM

(71) Applicant: KABUSHIKI KAISHA TOSHIBA, Tokyo (JP)

(72) Inventor: Takeshi Tajima, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 45 days.

(21) Appl. No.: 13/971,535

(22) Filed: Aug. 20, 2013

(65) Prior Publication Data

US 2013/0335300 A1  Dec. 19, 2013

Related U.S. Application Data

(63) Continuation of application No. PCT/JP2013/057946, filed on Mar. 13, 2013.

(30) Foreign Application Priority Data

May 29, 2012 (JP) ................................. 2012-122284

(51) Int. Cl.
*G09G 5/00* (2006.01)
*G06F 3/14* (2006.01)

(52) U.S. Cl.
CPC .............. *G06F 3/14* (2013.01); *G06F 3/1454* (2013.01); *G09G 5/006* (2013.01); *G09G 2340/0407* (2013.01); *G09G 2340/0428* (2013.01); *G09G 2340/0435* (2013.01); *G09G 2370/042* (2013.01); *G09G 2370/16* (2013.01)

(58) Field of Classification Search
None
See application file for complete search history.

(56) References Cited

U.S. PATENT DOCUMENTS

| | | | |
|---|---|---|---|
| 6,877,099 B2 | 4/2005 | Sameshima et al. | |
| 8,401,461 B2 | 3/2013 | Funabiki et al. | |
| 2009/0322948 A1* | 12/2009 | Funabiki et al. | 348/571 |
| 2010/0296558 A1* | 11/2010 | Matsushita et al. | 375/220 |
| 2011/0305203 A1 | 12/2011 | Matsushita et al. | |
| 2013/0335300 A1 | 12/2013 | Tajima | |

FOREIGN PATENT DOCUMENTS

| | | |
|---|---|---|
| JP | 2002-323884 A | 11/2002 |
| JP | 2002-323885 A | 11/2002 |
| JP | 2002-323942 A | 11/2002 |

(Continued)

OTHER PUBLICATIONS

International Search Report issued by Japan Patent Office on Jun. 18, 2013 in the corresponding PCT Application No. PCT/JP2013/057946.

*Primary Examiner* — Kenneth B Lee, Jr.
(74) *Attorney, Agent, or Firm* — Knobbe, Martens, Olson & Bear, LLP

(57) ABSTRACT

According to one embodiment, an electronic apparatus includes a virtual identification information generator and a display controller. The virtual identification information generator generates a virtual identification information item to virtualize the display, for each of two or more external devices wirelessly connected to the electronic apparatus by use of a wireless communication module, based on specific identification information of the display including information indicative of properties of the display. The display controller displays image signals transmitted from the external devices on a display. The display image signals are generated by the external devices based on the virtual identification information items.

12 Claims, 3 Drawing Sheets

(56) References Cited

FOREIGN PATENT DOCUMENTS

| JP | 2004-013795 A | 1/2004 |
| JP | 2006-294120 A | 10/2006 |
| JP | 2010-272975 A | 12/2010 |
| WO | WO 2007/094347 A1 | 8/2007 |
| WO | WO 2013/179736 A1 | 12/2013 |

* cited by examiner

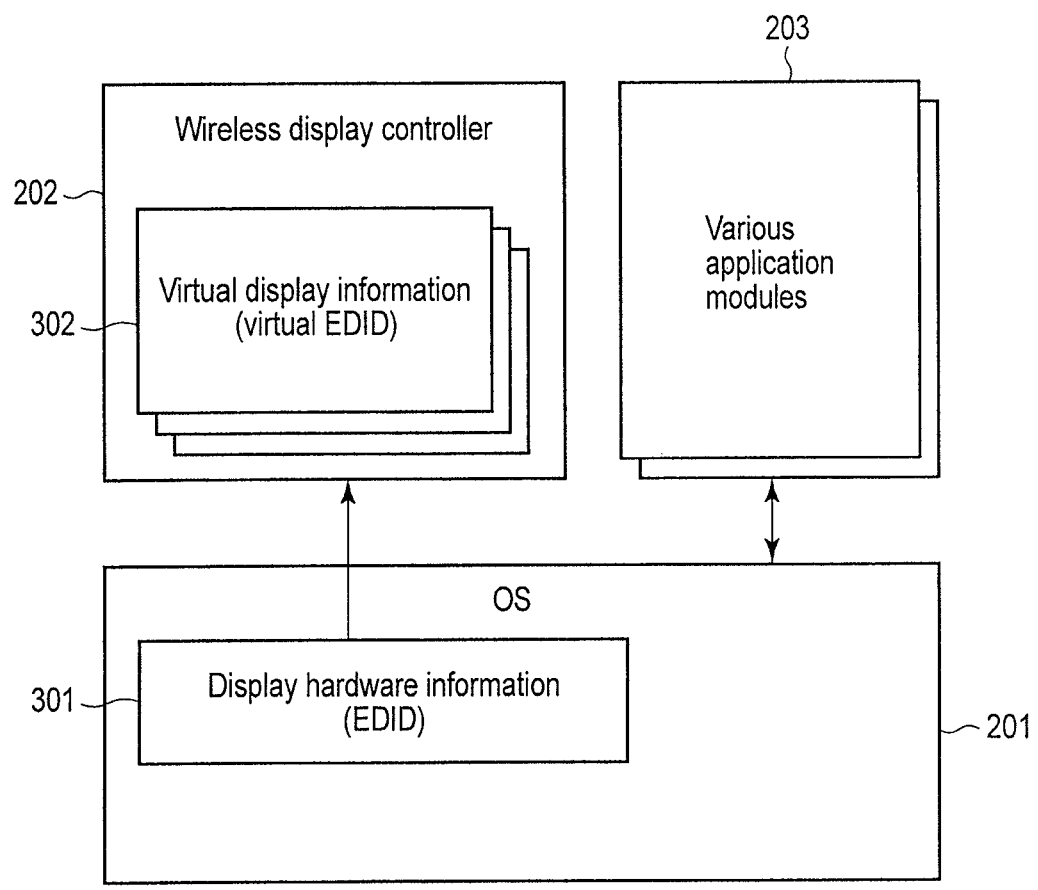
F I G. 3

ELECTRONIC APPARATUS, CONTROL METHOD, AND STORAGE MEDIUM

CROSS REFERENCE TO RELATED APPLICATIONS

This application is a Continuation Application of PCT Application No. PCT/JP2013/057946, filed Mar. 13, 2013 and based upon and claiming the benefit of priority from Japanese Patent Application No. 2012-122284, filed May 29, 2012, the entire contents of all of which are incorporated herein by reference.

FIELD

Embodiments described herein relate generally to a control technique which is suitable for wireless displays and the like.

BACKGROUND

In recent years, electronic apparatuses including a wireless communication function have become widespread. For example, users who have display apparatuses (wireless display) which include a wireless communication function and tablet terminals which include a wireless communication function can easily view movies which are taken into the tablet terminals from Web sites on large screens of the display apparatuses.

For example, when the display apparatus is connected to a personal computer (PC), the PC obtains information called an EDID from the display apparatus. The EDID represents information which indicates the properties of the display apparatus such as resolution and refresh rate (frequency), and a serial number (including a manufacturer ID and a model ID) which is uniquely assigned to the display apparatus. The personal computer generates an image signal which is suitable for the connected display apparatus, based on the EDID. Specifically, by the EDID, the personal computer can use various display apparatuses as monitors. In other words, the display apparatus can be used as a monitor for various electronic apparatuses, by the EDID.

In connection means of the prior art which uses an EDID, the EDID does not include a setting value which is determined in consideration of simultaneous output of pictures. Therefore, when a plurality of inputs are simultaneously displayed on a display, the pictures are generally reduced by a reducing function (scaling function) which is included in the display, without consideration of the setting value of the EDID. Therefore, the resolution of the input display does not agree with the display resolution, and optimum (dot-by-dot) screen display cannot be performed. In the prior art, output which is optimized for a reduced picture cannot be automatically performed from input.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 3 is an exemplary diagram illustrating a software configuration of the electronic apparatus according to the embodiment.

DETAILED DESCRIPTION

Various embodiments will be described hereinafter with reference to the accompanying drawings.

In general, according to one embodiment, an electronic apparatus includes a display, a wireless communication module, a virtual identification information generator, a virtual identification information returning module and a display controller. The virtual identification information generator is configured to generate a virtual identification information item to virtualize the display, for each of two or more external devices wirelessly connected to the electronic apparatus by use of the wireless communication module, based on specific identification information of the display comprising information indicative of properties of the display. The virtual identification information returning module is configured to return the virtual identification information item generated by the virtual identification information generator to each of the respective external devices which request the specific identification information of the display. The display controller is configured to display image signals transmitted from the external devices on the display. The display image signals are generated by the external devices based on the virtual identification information items returned by the virtual identification information returning module.

Figure 1:
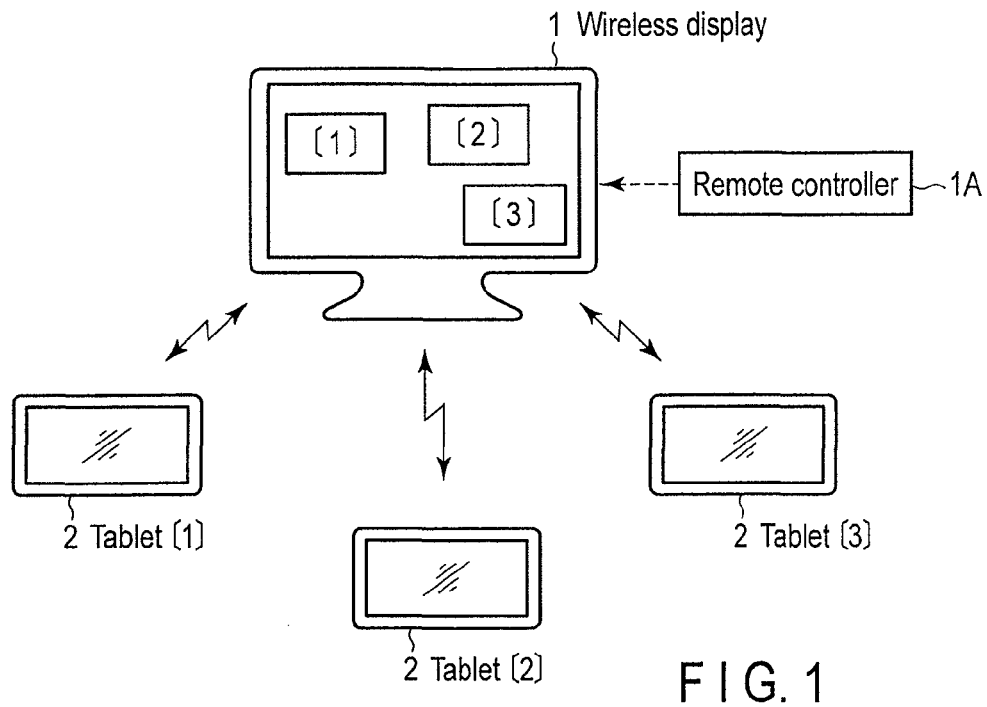
FIG. 1 is an exemplary diagram illustrating a mode of using an electronic apparatus (wireless display) according to an embodiment.

FIG. 1 is an exemplary diagram illustrating a mode of using an electronic apparatus (wireless display) 1 according to the present embodiment. The wireless display 1 may be, for example, a television set which includes a wireless communication function.

As illustrated in FIG. 1, the wireless display 1 can wirelessly connect with a plurality of external devices (tablets) 2, and display image signals which are transmitted from the tablets 2. For example, images which are played back on the respective tablets 2 by respective users can be viewed together by all the users on the wireless display 1, and content which is held in the tablets 2 by the respective users can be displayed on the wireless display 2 to be compared and discussed by all the users. The mechanism of the wireless display 1 which can display image signals that are transmitted from the tablets 2 will be detailed hereinafter.

The wireless display includes an infrared light receiving function, and can receive operation signals from a remote controller 1A. The user can use the remote controller 1A to cause the wireless display 1 to display image signals transmitted from the tablets 2 side by side as illustrated in FIG. 1, or display one of the image signals selected from the image signals. Specifically, the wireless display 1 has a first display mode in which image signals transmitted from the tablets 2 are displayed side by side, and a second display mode in which one of image signals transmitted from the tablets 2 is exclusively selected and displayed. FIG. 1 illustrates a state in which the wireless display 1 displays the image signals in the first display mode.

Although the present embodiment shows an example in which the wireless display 1 is equipped with a mechanism of enabling the wireless display 1 to display image signals transmitted from the tablets 2, each tablet 2 (which also serves as a display device) which includes a touch panel display may be equipped with the mechanism.

Figure 2:
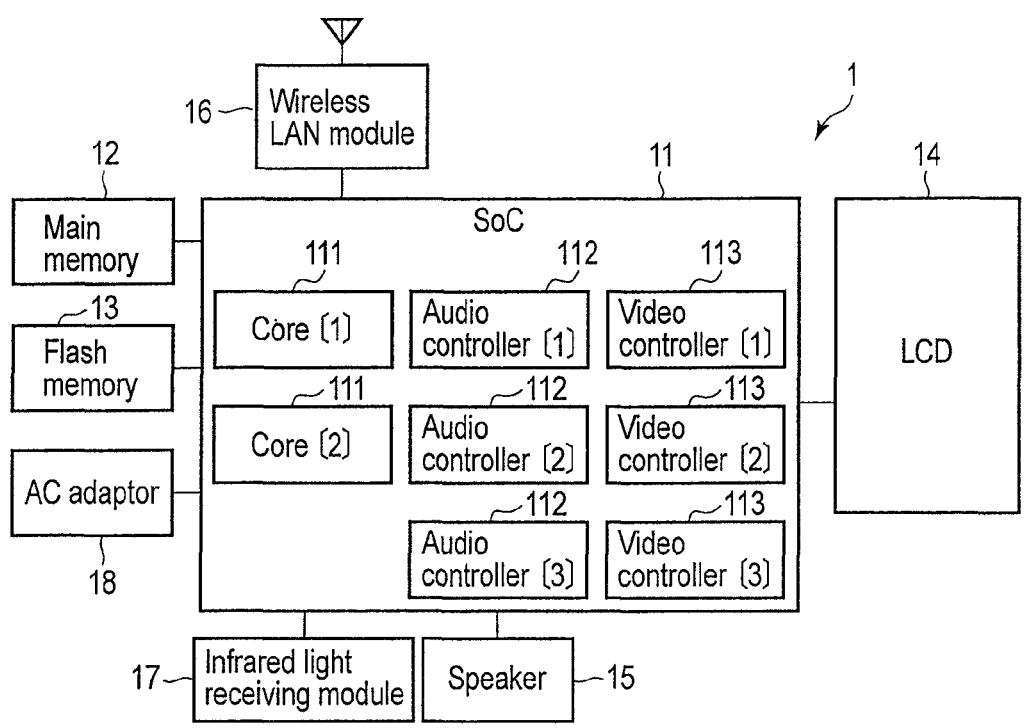
FIG. 2 is an exemplary diagram illustrating a hardware configuration of the electronic apparatus according to the embodiment.

FIG. 2 is an exemplary diagram illustrating a hardware configuration of the wireless display 1.

As illustrated in FIG. 2, the wireless display 1 includes a system-on-a-chip (SoC) 11, a main memory 12, a flash memory 13, an LCD 14, a speaker 15, a wireless LAN module 16, an infrared light receiving module 17, and an AC adaptor 18.

The SoC 11 is a single-chip microcomputer in which main functions of the wireless display 1 are integrated. Various controllers which drive and control various devices that are connected to the SoC 11 are formed in the SoC 11. The SoC 11 includes two cores 111, and includes three sets, each of which is formed of a pair of an audio controller 112 and a video controller 113.

Each core 111 is a processor which controls operation of the wireless display 1. The two cores 111 load various programs which are stored in the flash memory 13 into the main memory 12 and execute the programs in cooperation with each other.

Each audio controller 112 outputs a sound signal which is received from the tablet 2 from the wireless LAN module 16 to the speaker 15. Each video controller 113 displays an image signal which is received from the tablet 2 by means of the wireless LAN module 16 on the LCD 14. The wireless display 1 which includes three sets, each of which is formed of an audio controller 112 and a video controller 113, can process three sound signals and three image signals in parallel. Also, the wireless display 1 can process four or more sound signals and image signals in parallel, by using the audio controller 112 and the video controllers 113 in a time-division manner.

The infrared light receiving module 17 receives infrared light which is transmitted as an operation signal from the remote controller 1A. The AC adaptor 18 inputs electric power for operating the wireless display 1 from an external commercial power source.

FIG. 3 is an exemplary diagram illustrating a software configuration of the wireless display 1.

As illustrated in FIG. 3, various programs which are loaded from the flash memory 13 into the main memory 12 and executed by the cores 111 include an operating system (OS) 201 which performs resource management of the wireless display 1, a wireless display control module 202 and various application modules 203 which operate under control of the OS 201.

The wireless display control module 202 is a module which virtualizes the wireless display 1 such that the wireless display 1 can be used from the tablets 2. More specifically, the wireless display control module 202 is a module which logically expands the wireless display 1, which is physically a one display, to a plurality of displays by virtualization.

The OS 201 holds the EDID (display hardware information 301) of the wireless display 1. The wireless display control module 202 obtains the EDID from the OS 201, and generates a plurality of virtual EDIDs (virtual display information items 302) based on the obtained EDID. Since the EDID describes a serial number which is uniquely assigned to the display apparatus, the wireless display control module 202 generates a plurality of virtual EDIDs, by changing the lower digits of the serial number to values which are different between the virtual EDIDs, for example. When the wireless display 1 is wirelessly connected to more than one tablets 2, the wireless display control module 202 performs control of supplying virtual EDIDs to the more than one tablets 2 which request EDIDs, such that virtual EDIDs of different values are assigned to the more than one tablets 2.

In addition, the wireless display control module 202 obtains information which indicates a state of wireless connection with each tablet 2 from the wireless LAN module 16 (by means of the OS 201), and changes the value of the virtual EDID generated for the tablet 2 based on the information. The wireless connection state is, for example, intensity of radio signals and/or communication speed.

The EDID includes property information such as resolution, refresh rate (frequency), and the number of display colors, which the LCD 14 and the video controller 113 can handle. The EDID also includes property information such as the sound signal bit rate and the number of sound signal channels which the speaker 15 and the audio controller 112 can handle. Therefore, when the radio signal condition is not good or the communication speed is low, the wireless display control module 202 makes a change, such as reducing the resolution, when the virtual EDID is generated based on the EDID.

Examples of changes to be added to the EDID are as follows:

(1) Reduce the resolution (for example, 1280×1024 dots→800×600 dots)

(2) Reduce the refresh rate (for example, 120 Hz→60 Hz)

(3) Reduce the number of display colors (for example, 32 bits→24 bits)

(4) Reduce the bit rate of sound (for example, 128 bps→64 bps)

(5) Reduce sound channels (for example, 5.1 ch→stereo, stereo→mono)

Making the above changes are not limited to the cases where the radio signal condition is not good or the communication speed is low, but changes such as reducing the resolution may be uniformly added to virtual EDIDs as specification when virtual EDIDs are generated based on the EDID. In addition, changes such as reducing the resolution may be added according to the number of tablets 2 which are wirelessly connected to the wireless display 1. For example, when the wireless display 1 is wirelessly connected with third tablet 2 in the state where the wireless display 1 is wirelessly connected with two tablets 2, the wireless display control module 202 controls the wireless LAN module 16 to temporarily disconnect the existing two tablets 2. Since each of the disconnected tablets 2 obtains an EDID again when the wireless connection is restored, the wireless display control module 202 generates virtual EDIDs again in consideration of addition of the third tablet 2, and returns the virtual EDIDs to the two tablets 2.

Besides, when the number of connected tablets 2 (which transmit image signals and sound signals) reaches the number which can be handled by the three sets of audio controllers 112 and the video controllers 113 that are formed in the SoC 11, the wireless display control module 202 returns a status, which indicates that the wireless display 1 is being used, to tablets 2 which request an EDID thereafter.

The wireless display control module 202 can perform display control between the first display mode in which image signals transmitted from the tablets 2 are displayed side by side on the LCD 14, and the second display mode in which one of image signals transmitted from the tablets 2 is exclusively selected and displayed. As described above, the wireless display 1 can receive an operation signal from the remote controller 1A. The wireless display control module 202 performs switching between the first display mode and the second display mode, based on an operation signal from the remote controller 1A.

Figure 4:
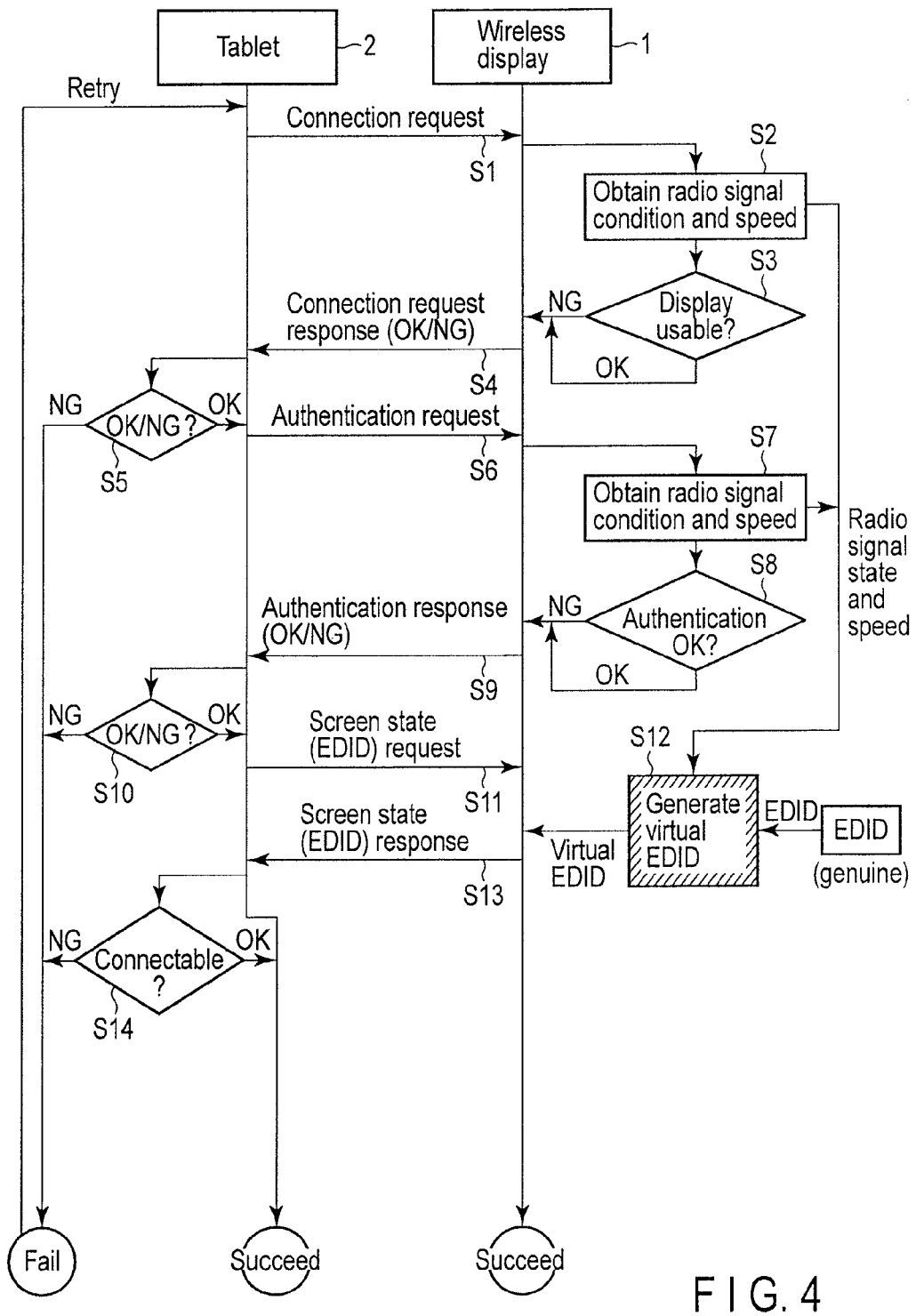
FIG. 4 is an exemplary timing chart illustrating an operation procedure of the electronic apparatus according to the embodiment.

FIG. 4 is an exemplary timing chart illustrating an operation procedure of the wireless display 1.

When the wireless display 1 receives a connection request from the tablet 2 (Step S1), the wireless display 1 obtains the radio signal condition and the speed (Step S2). The wireless display 1 determines whether the wireless display 1 is usable or not (Step S3), and returns a determination result as a connection request response to the tablet 2 (Step S4).

The tablet 2 checks the connection request response returned from the wireless display 1 (Step S5). When the wireless display 1 is usable, the tablet 2 requests the wireless display 1 to perform authentication (Step S6). The wireless display 1 obtains the radio signal condition and the speed, also when the wireless display 1 receives an authentication request from the tablet 2 (Step S7). The wireless display 1 determines whether the tablet 2 can be authenticated or not (Step S8), and returns a determination result as an authentication response to the tablet 2 (Step S9).

The tablet 2 checks the authentication response returned from the wireless display 1 (Step S10). When the tablet 2 is authenticated, the tablet 2 requests a screen state (EDID) from the wireless display 1 (Step S11). The wireless display 1 generates a virtual EDID from the (genuine) EDID, based on the radio signal condition and the speed which have been obtained when the connection request or the authentication request has been received (Step S12). The wireless display 1 returns the generated virtual EDID as a screen state (EDID) response to the tablet 2 (Step S13).

The tablet 2 checks the screen state (EDID) response returned from the wireless display 1, and determines whether the tablet 2 can be connected to the wireless display 1 (which has the properties indicated by the virtual EDID) (Step S14). When a connection request response which indicates that the wireless display 1 is not usable or authentication ended in failure is returned from the wireless display 1, the tablet 2 properly retries a connection request for the wireless display 1.

As described above, the present wireless display 1 expands the EDID which is peculiar to the wireless display 1 to a plurality of EDIDs by virtualization, and thereby enables display of image signals which are transmitted from two or more external devices on the display.

The operation control processing of the embodiment can be realized by software (program). Therefore, the same effect as that of the embodiment can be easily achieved, by installing the software in an ordinary computer by means of a storage medium, which stores the software and can be read by a computer, and executing the software.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus comprising:
    a display;
    a wireless communication module;
    a virtual identification information generator configured to generate a virtual identification information item to virtualize the display, for each of two or more external devices wirelessly connected to the electronic apparatus by use of the wireless communication module, based on specific identification information of the display comprising information indicative of properties of the display;
    a virtual identification information returning module configured to return the virtual identification information item generated by the virtual identification information generator to each of the respective external devices which request the specific identification information of the display; and
    a display controller configured to display image signals transmitted from the external devices on the display, the display image signals being generated by the external devices based on the virtual identification information items returned by the virtual identification information returning module,
    wherein the display controller comprises a first display mode in which the image signals transmitted from the external devices are displayed side by side on the display, and a second mode in which one of the image signals transmitted from the external devices is exclusively selected and displayed on the display.

2. The apparatus of claim 1, wherein the virtual identification information generator is configured to change the information indicative of the properties of the display in the specific identification information of the display, and to include the changed information in each of the virtual identification information items generated for the respective external devices.

3. The apparatus of claim 2, wherein the virtual identification information generator is configured to change the information indicative of the properties of the display in the specific identification information of the display, according to a wireless connection state between the wireless communication module and each of the external devices.

4. The apparatus of claim 2, wherein the virtual identification information generator is configured to change resolution of the display.

5. The apparatus of claim 2, wherein the virtual identification information generator is configured to change a refresh rate of the display.

6. The apparatus of claim 2, wherein the virtual identification information generator is configured to change number of colors the display can display.

7. The apparatus of claim 2, further comprising a sound processor, wherein:
    the specific identification information of the display comprises information indicative of properties of the sound processor; and
    the virtual identification information generator is configured to change a sound signal bit rate the sound processor can process.

8. The apparatus of claim 2, further comprising a sound processor, wherein:
    the specific identification information of the display comprises information indicative of properties of the sound processor; and
    the virtual identification information generator is configured to change number of sound signal channels the sound processor can process.

9. The apparatus of claim 1, wherein the virtual identification information generator is configured to change part of a serial number in the specific identification information of the display and uniquely assigned to the display, to different values for the respective external devices.

10. The apparatus of claim 1, further comprising a wireless connection controller configured to limit a number of the external devices wirelessly connected to the electronic apparatus by use of the wireless communication module, to a first number.

11. A method of controlling an electronic apparatus comprising a display and a wireless communication module, the method comprising:

generating a virtual identification information item to virtualize the display, for each of two or more external devices wirelessly connected to the electronic apparatus by use of the wireless communication module, based on specific identification information of the display comprising information indicative of properties of the display;

returning the generated virtual identification information items to the respective external devices which request the specific identification information of the display; and displaying image signals transmitted from the external devices on the display, the image signals being generated by the external devices based on the returned virtual identification information items, wherein the displaying the image signals comprises a first display mode in which the image signals transmitted from the external devices are displayed side by side on the display, and a second mode in which one of the image signals transmitted from the external devices is exclusively selected and displayed on the display.

12. A computer-readable, non-transitory storage medium having stored thereon a computer program which is executable by a computer comprising a display and a wireless communication module, the computer program controlling the computer to function as:

a virtual identification information generator configured to generate a virtual identification information item to virtualize the display, for each of two or more external devices wirelessly connected to the computer by use of the wireless communication module, based on specific identification information of the display comprising information indicative of properties of the display;

a virtual identification information returning module configured to return the virtual identification information item generated by the virtual identification information generator to each of the respective external devices which request the specific identification information of the display; and a display controller configured to display image signals transmitted from the external devices on the display, the image signals being generated by the external devices based on the virtual identification information items returned by the virtual identification information returning module, wherein the display controller comprises a first display mode in which the image signals transmitted from the external devices are displayed side by side on the display, and a second mode in which one of the image signals transmitted from the external devices is exclusively selected and displayed on the display.

* * * * *